(12) United States Patent
Wang et al.

(10) Patent No.: US 11,024,045 B2
(45) Date of Patent: Jun. 1, 2021

(54) METHOD AND APPARATUS FOR GENERATING THREE-DIMENSIONAL DATA, DEVICE, AND STORAGE MEDIUM

(71) Applicant: BAIDU ONLINE NETWORK TECHNOLOGY (BEIJING) CO., LTD., Beijing (CN)

(72) Inventors: Yucheng Wang, Beijing (CN); Xun Sun, Beijing (CN); Tian Xia, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 96 days.

(21) Appl. No.: 16/562,129

(22) Filed: Sep. 5, 2019

(65) Prior Publication Data

US 2020/0082553 A1 Mar. 12, 2020

(30) Foreign Application Priority Data

Sep. 7, 2018 (CN) .......................... 201811045660.6

(51) Int. Cl.
*G06T 7/50* (2017.01)
*G06T 7/70* (2017.01)
(Continued)

(52) U.S. Cl.
CPC .............. *G06T 7/50* (2017.01); *G06K 9/6211* (2013.01); *G06T 7/11* (2017.01); *G06T 7/187* (2017.01);
(Continued)

(58) Field of Classification Search
CPC ... G06T 7/11; G06T 7/12; G06T 7/174; G06T 7/50; G06T 7/536; G06T 7/55;
(Continued)

(56) References Cited

U.S. PATENT DOCUMENTS

2015/0332474 A1 11/2015 El Dokor et al. .... G06T 7/0097
2018/0068191 A1* 3/2018 Biemeretal. ............ B60R 11/04
(Continued)

FOREIGN PATENT DOCUMENTS

CN 105241424 A 1/2016 ............ G01C 11/00
CN 105333837 A 2/2016 ............ G01B 11/24
(Continued)

OTHER PUBLICATIONS

Machine translation of CN 105241424 A, Jan. 2016.*
(Continued)

*Primary Examiner* — Andrew W Johns
(74) *Attorney, Agent, or Firm* — Fay Sharpe LLP (57) ABSTRACT

Embodiments of the present disclosure provide a method and an apparatus for generating three-dimensional data, a device, and a storage medium. The method comprises: obtaining a profile information annotation result for a target object in a two-dimensional image; calculating depth of field of the target object and a three-dimensional orientation of the target object according to the profile information annotation result and a standard three-dimensional size of the target object; determining a three-dimensional coordinate of a reference two-dimensional image point in the target object according to a two-dimensional coordinate of the reference two-dimensional image point in the two-dimensional image and the depth of field; and generating three-dimensional data matching the target object according to the three-dimensional coordinate of the reference two-dimensional image point and the three-dimensional orientation of the target object.

20 Claims, 4 Drawing Sheets

(51) Int. Cl.
  *G06K 9/62* (2006.01)
  *G06T 7/11* (2017.01)
  *G06T 7/187* (2017.01)

(52) U.S. Cl.
  CPC ...... *G06T 7/70* (2017.01); *G06T 2207/30252* (2013.01)

(58) Field of Classification Search
  CPC .. G06T 7/564; G06T 7/70; G06T 7/74; G06T 2207/20128; G06T 2207/30252; G06K 9/00785; G06K 9/34; G06K 9/4604; G06K 9/4609; G06K 9/6201; G06K 9/6202; G06K 9/6204; G06K 9/6211; G06K 2009/6213
  See application file for complete search history.

(56) References Cited

U.S. PATENT DOCUMENTS

| | | | |
|---|---|---|---|
| 2018/0150969 A1* | 5/2018 | Niwayama | G06T 7/73 |
| 2018/0211399 A1 | 7/2018 | Lee et al. | G06T 7/529 |

FOREIGN PATENT DOCUMENTS

| | | | | |
|---|---|---|---|---|
| CN | 105447812 A | 3/2016 | | |
| CN | 105704476 A | 6/2016 | ............ | H04N 13/02 |
| CN | 106251330 A | 12/2016 | ............... | G06T 7/00 |
| JP | H1055446 A | 2/1998 | ............... | G06T 7/60 |
| JP | 2006053756 A | 2/2006 | ............... | G06T 7/20 |

OTHER PUBLICATIONS

Chen et al., "3D Free-Form Object Recognition Using Indexing by Contour Features," Computer Vision and Image Understanding, vol. 71, No. 3, Sep. 1998, pp. 334-355.*
Calvin Huang, "Adding a Dimension: Annotating 3d Objects with 2d Data", 8 pages, 2018.
Artitical Intelligence, "Measuring Object Size Using Deep Neural Network", 2 pages, 2017.
Thomas Tatschke et al., "Semi-autonomous reference data generation for perception performance evaluation", 8 pages, 2007.
Extended European Search Report for EP Application No. 19195798.4-1210, dated Nov. 15, 2019, 9 pages.
Office Action for Japanese Application No. 2019-163317, dated Sep. 8, 2020, 6 pages.
Jin-Jong et al., "3D Free-Form Object Recognition Using Indexing by Contour Features", Department of Computer Science, Michigan State University, 1996.
Office Action for Chinese Application No. 201811045660.6, 10 pages total, dated Mar. 2, 2020.

* cited by examiner

METHOD AND APPARATUS FOR GENERATING THREE-DIMENSIONAL DATA, DEVICE, AND STORAGE MEDIUM

CROSS REFERENCE TO RELATED APPLICATION

This application claims priority under 35 U.S.C. § 119(a) on Chinese Patent Application No. 201811045660.6, filed with the State Intellectual Property Office of P. R. China on Sep. 7, 2018, the entire contents of which are incorporated herein by reference.

TECHNICAL FIELD

Embodiments of the present disclosure relate to information processing technologies, and more particularly to a method and an apparatus for generating three-dimensional data, a device, and a storage medium.

BACKGROUND

During automatic driving, three-dimensional information detection for a vehicle is critical for sensing and planning in a driving environment.

In the related art, the three-dimensional information detection relies on the annotation on the three-dimensional information of the vehicle. The annotation is generally performed manually. Therefore, it is very expensive and time-consuming to perform the annotation on the three-dimensional information. On the other hand, conventional two-dimensional annotation method with low cost and high speed could not satisfy the requirements for obtaining three-dimensional information data.

SUMMARY

Embodiments of the present disclosure provides a method and an apparatus for generating three-dimensional data, a device, and a storage medium, to reduce cost of three-dimensional annotation and to improve efficiency of the three-dimensional annotation.

In a first aspect, embodiments of the present disclosure provide a method for generating three-dimensional data, comprising: obtaining a profile information annotation result for a target object in a two-dimensional image; calculating depth of field of the target object and a three-dimensional orientation of the target object according to the profile information annotation result and a standard three-dimensional size of the target object; determining a three-dimensional coordinate of a reference two-dimensional image point in the target object according to a two-dimensional coordinate of the reference two-dimensional image point in the two-dimensional image and the depth of field; and generating three-dimensional data matching the target object according to the three-dimensional coordinate of the reference two-dimensional image point and the three-dimensional orientation of the target object.

In a second aspect, embodiments of the present disclosure also provide an apparatus for generating three-dimensional. The apparatus includes: a result obtaining module, a three-dimensional calculation module, a coordinate determination module, and a data generation module.

The result obtaining module is configured to obtain a profile information annotation result for a target object in a two-dimensional image.

The three-dimensional calculation module is configured to calculate depth of field of the target object and a three-dimensional orientation of the target object according to the profile information annotation result and a standard three-dimensional size of the target object.

The coordinate determination module is configured to determine a three-dimensional coordinate of a reference two-dimensional image point in the target object according to a two-dimensional coordinate of the reference two-dimensional image point in the two-dimensional image and the depth of field.

The data generation module is configured to generate three-dimensional data matching the target object according to the three-dimensional coordinate of the reference two-dimensional image point and the three-dimensional orientation of the target object.

In a third aspect, embodiments of the present disclosure also provide a computer device. The computer device includes a memory, a processor and a computer program stored in the memory and operated in the processor. When the computer program is executed by the processor, the processor is configured to implement a method for generating three-dimensional data according to embodiments of the present disclosure.

In a fourth aspect, embodiments of the present disclosure also provide a computer readable storage medium having a computer program stored thereon. When the computer program is executed by a processor, the computer program is configured to implement a method for generating three-dimensional data according to embodiments of the present disclosure.

In the method and the apparatus for generating the three-dimensional data, by calculating the depth of field of the target object and the three-dimensional orientation of the target object according to the obtained profile information annotation result for a target object in a two-dimensional image and the standard three-dimensional size of the target object, determining the three-dimensional coordinate of the reference two-dimensional image point in the target object according to the two-dimensional coordinate of the reference two-dimensional image point in the two-dimensional image and the depth of field, and generating the three-dimensional data matching the target object according to the three-dimensional coordinate and the three-dimensional orientation of the target object, the three-dimensional information may be predicted by using the two-dimensional annotation, which solves the problem in the related art that the three-dimensional annotation is very expensive and time-consuming due to the manual annotation in the three-dimensional annotation, thereby reducing the cost of three-dimensional annotation and improving the efficiency of the three-dimensional annotation.

DETAILED DESCRIPTION

Detailed description will be further made below to the present disclosure with reference to the accompanying drawings and the embodiments. It should be understood that, detailed embodiments described herein are intended only to explain the present disclosure, and are not intended to limit the present disclosure. In addition, it should be further noted that, for the convenience of description, only some contents but not all of the structure related to the present disclosure are illustrated in the accompanying drawings.

In addition, it should be further noted that, for the convenience of description, only some contents but not all of the structure related to the present disclosure are illustrated in the accompanying drawings. It should be mentioned before discussing exemplary embodiments Specifically that, some exemplary embodiments are described as processing of flow charts or methods. Although the flow chart describes respective operations (or steps) sequentially, some operations may be implemented in parallel, concurrently or simultaneously. In addition, the sequence of respective operations may be rearranged. When the operations are completed, the processing may be stopped. However, additional steps not included in the accompanying drawings may also be included. The processing may correspond to methods, functions, procedures, subroutines, subprograms, and the like.

Embodiment 1

Figure 1A:
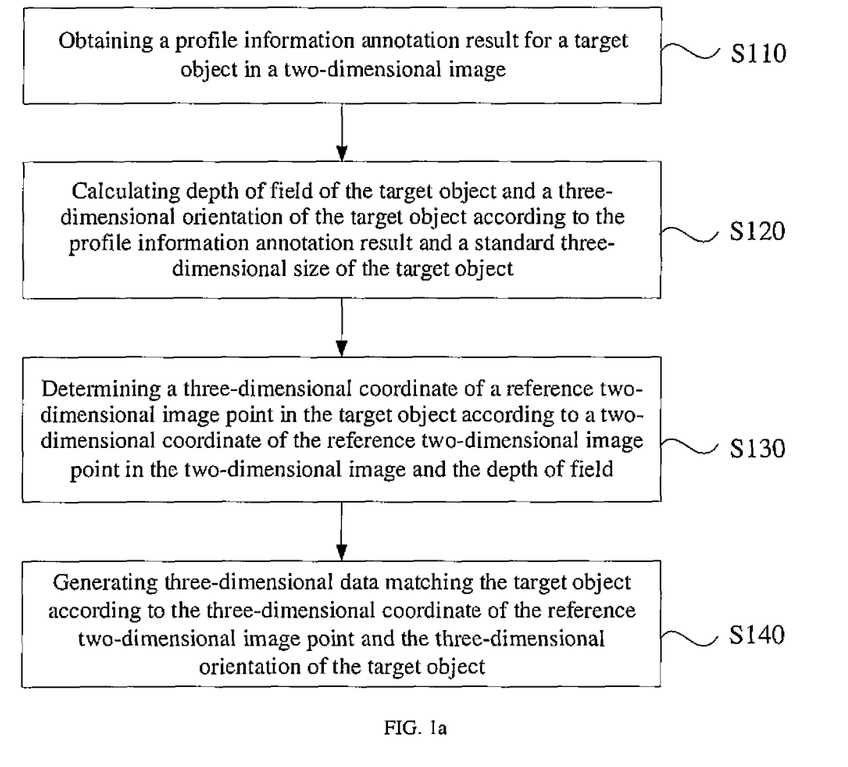
FIG. 1a is a flow chart illustrating a method for generating three-dimensional data provided in Embodiment 1 of the present disclosure.

FIG. 1a is a flow chart illustrating a method for generating three-dimensional data provided in Embodiment 1 of the present disclosure. This embodiment may be applicable to a case where three-dimensional information annotation is performed on an object. The method may be executed by an apparatus for generating three-dimensional data provided in the embodiments of the present disclosure. The apparatus may be implemented in software and/or hardware, and may generally be integrated in a computer device. As illustrated in FIG. 1a, the method specifically comprises the following steps.

At step S110, a profile information annotation result for a target object in a two-dimensional image is obtained.

In this embodiment, an image of the target object collected at a preset angle may be used as the second-dimensional image of the target object. Here, the preset angle includes but is not limited to any orientation in which the device is at the same level as the target object. For example, an image of a target vehicle may be captured and collected by a laser radar in an unmanned vehicle as the obtained two-dimensional image.

Here, the profile information annotation result may be an annotation result in the obtained two-dimensional image that may characterize profile characteristics of the target object. For example, when the target object is a vehicle, its profile information annotation result may be an enclosing rectangular frame of the vehicle (i.e. an outer frame of the vehicle) in the two-dimensional image, or a position of a dividing line (i.e. a split line) between a head of the vehicle and a body of the vehicle in the outer frame.

Specifically, a recognition process may be performed on the two-dimensional image through an image recognition technology, to recognize the profile information of the target object in the two-dimensional image, which is in turn annotated to generate the profile information annotation result.

Alternatively, after obtaining the profile information annotation result for the target object in the two-dimensional image, the method may further comprise: cutting a partial image from the two-dimensional image that matches the target object according to the profile information annotation result, and inputting the partial image into a pre-trained standard three-dimensional recognition model, to obtain the standard three-dimensional size of the target object.

The partial image that is cut out and matches the target object may be a part of the image that corresponds to the enclosing rectangular frame of the target object in the two-dimensional image. Specifically, the standard three-dimensional recognition model may be a model which is established based on a deep machine learning algorithm, which is configured to recognize an image corresponding to the object and to predict a real three-dimensional size, i.e. the standard three-dimensional size, corresponding to the object. A machine learning algorithm employed by the standard three-dimensional recognition model includes but is not limited to a deep convolutional neural network. For example, the depth convolutional neural network model may be trained by first collecting a large number of image samples corresponding to different objects to obtain a model allowing to predict the standard three-dimensional size of the object from the image as the standard three-dimensional recognition model, and then inputting the partial image that is cut out and matches the target object into the standard three-dimensional recognition model to predict the standard three-dimensional size of the target object according to, e.g., the length, width and height (L, W, and H) of the image of the target object. Further, a size-of-target-object template may be provided to match the obtained standard three-dimensional size with the size-of-target-object template so as to filter out unreasonable values, thereby further improving the accuracy of prediction.

At step S120, depth of field of the target object and a three-dimensional orientation of the target object is calculated according to the profile information annotation result and the standard three-dimensional size of the target object.

The profile information annotation result is critical profile information of the target object that is obtained based on the two-dimensional image, while the standard three-dimensional size of the target object is an actual size of the target object. Therefore, the profile information annotation result may be combined with the standard three-dimensional size of the target object, to obtain the three-dimensional information of the target object on the basis of the two-dimensional image. Here, the three-dimensional information includes but is not limited to the depth of field of the target object and the three-dimensional orientation of the target object. The benefit of predicting the three-dimensional information with the two-dimensional annotation is that, the detection effect equivalent to the three-dimensional annotation which is very expensive and time-consuming may be achieved by utilizing the two-dimensional annotation with a lower cost and a faster speed.

Specifically, the depth of field of the target object may be a distance between the target object and a photographing focus corresponding to the two-dimensional image. The three-dimensional orientation of the target object may be an angle between an orientation of the target object and a photographing plane.

Figure 1B:
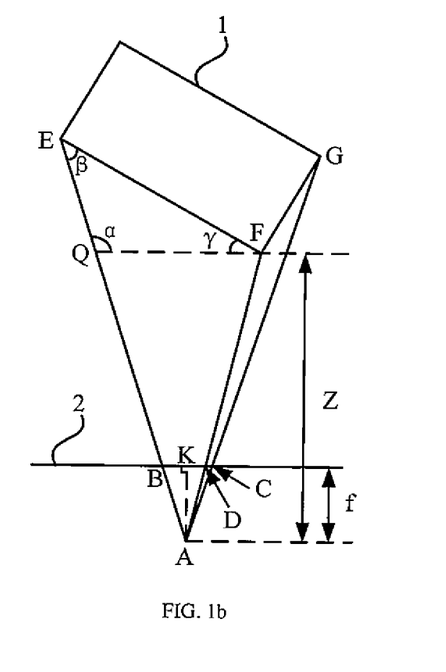
FIG. 1b is a schematic diagram illustrating a plan view showing the photographing of the vehicle that is applicable in Embodiment 1 of the present disclosure.

For example, as illustrated in the plan view in FIG. 1b which shows the photographing of the vehicle, an imaging range of the vehicle 1 in the two-dimensional image 2 is defined by intersection points B and C, which are the intersection points of a connecting line between the photographing focus A and the leftmost end point E of the vehicle 1 and a connecting line between the photographing focus A and the rightmost end point G of the vehicle 1 with the plane of the two-dimensional image 2. Here, the depth of field of the vehicle is a distance from the photographing focus A to an end point of the vehicle 1 that is closest to the two-dimensional image 2, i.e. the distance Z. The three-dimensional orientation of the vehicle 1 is the angle γ.

At step S130, a three-dimensional coordinate of a reference two-dimensional image point in the target object is determined according to a two-dimensional coordinate of the reference two-dimensional image point in the two-dimensional image and the depth of field.

In this embodiment, the reference two-dimensional image point may be any point of the target object in the two-dimensional image. For example, it may be a geometric central point of the enclosing rectangular frame of the target object in the two-dimensional image, i.e., the point K illustrated in FIG. 1*b*.

For example, a two-dimensional coordinate system may be established by taking an end point of the two-dimensional image as an origin. By recognizing the geometric central point of the enclosing rectangular frame of the target object, the coordinate of the geometric central point may be obtained based on the two-dimensional coordinate system, to be used as the two-dimensional coordinate of the reference two-dimensional image point in the target object in the two-dimensional image. In combination with the calculated depth of field of the target object, the three-dimensional coordinate of the reference two-dimensional image point may be determined according to a preset calculation equation.

Alternatively, determining the three-dimensional coordinate of the reference two-dimensional image point in the target object according to the two-dimensional coordinate of the reference two-dimensional image point in the two-dimensional image and the depth of field, comprises: calculating the three-dimensional coordinate P of the reference two-dimensional image point by the following equation:

$$P = \begin{bmatrix} \frac{Z}{f} & 0 & 0 \\ 0 & 0 & 0 \\ 0 & 0 & 1 \end{bmatrix} \begin{bmatrix} x \\ y \\ z \end{bmatrix},$$

where, x is an abscissa of the reference two-dimensional image point; y is an ordinate of the reference two-dimensional image point; Z is the depth of field; and f is a photographing focal length corresponding to the two-dimensional image.

Taking a practical example as an example, as illustrated in FIG. 1*b*, assuming that the coordinate of the geometric central point of the enclosing rectangular frame of the vehicle 1, i.e., the coordinate of the central point K of the outer frame of the vehicle 1, is (x, y), the three-dimensional coordinate corresponding to the central point of the outer frame of the vehicle 1 may be calculated as $$P = \begin{bmatrix} \frac{Z}{f}x \\ 0 \\ Z \end{bmatrix}$$

according to the above equation, where, Z is the depth of field of the vehicle 1; and f is the distance between the photographing plane where the two-dimensional image is located and the photographing focus A, i.e. the photographing focal length.

At step S140, three-dimensional data matching the target object is generated according to the three-dimensional coordinate of the reference two-dimensional image point and the three-dimensional orientation of the target object.

In this embodiment, when the three-dimensional coordinate of the reference two-dimensional image point and the three-dimensional orientation of the target object are determined, the three-dimensional coordinate corresponding to an image point to be measured may be determined based on a distance between the reference two-dimensional image point in the two-dimensional image and the image point to be measured in the target object according to the preset calculation equation. Accordingly, the three-dimensional data matching the entire target object may be generated according to the configuration of the three-dimensional coordinate corresponding to each image point. In this way, the three-dimensional annotation of the target object may be obtained by utilizing the two-dimensional annotation of the target object, which reduces the amount of human time for performing the three-dimensional annotation directly, and improves the efficiency of the three-dimensional annotation. In addition, since the whole process is completed automatically by a computer without any human intervention, the cost for the three-dimensional annotation may also be reduced.

The embodiments of the present disclosure provide a method for generating the three-dimensional data. By calculating the depth of field of the target object and the three-dimensional orientation of the target object according to the obtained profile information annotation result for a target object in a two-dimensional image and the standard three-dimensional size of the target object, determining the three-dimensional coordinate of the reference two-dimensional image point in the target object according to the two-dimensional coordinate of the reference two-dimensional image point in the two-dimensional image and the depth of field, and generating the three-dimensional data matching the target object according to the three-dimensional coordinate and the three-dimensional orientation of the target object, the three-dimensional information may be predicted by using the two-dimensional annotation, which solves the problem in the related art that the three-dimensional annotation is very expensive and time-consuming due to the manual annotation in the three-dimensional annotation, thereby reducing the cost of three-dimensional annotation and improving the efficiency of the three-dimensional annotation.

Embodiment 2

Figure 2:
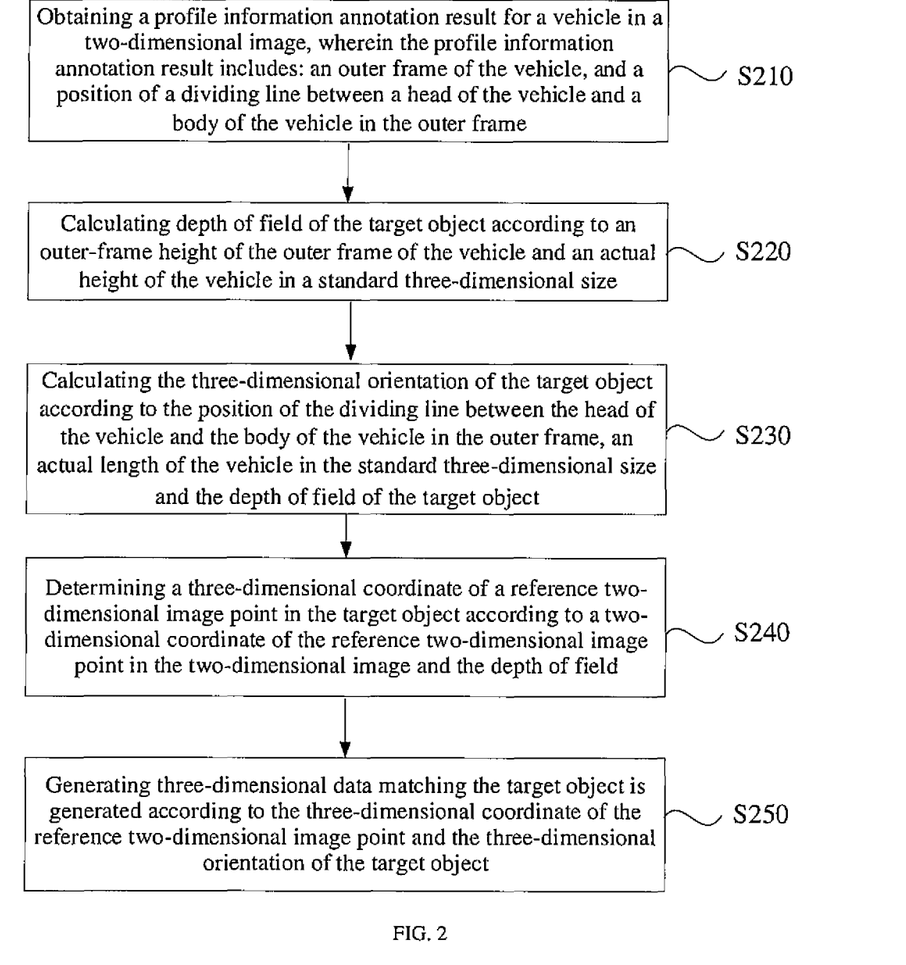
FIG. 2 is a flow chart illustrating a method for generating three-dimensional data provided in Embodiment 2 of the present disclosure.

FIG. 2 is a flow chart illustrating a method for generating three-dimensional data provided in Embodiment 2 of the present disclosure. This embodiment is embodied on a basis of the above embodiment. In this embodiment, the target object is specifically implemented as a vehicle, and the profile information annotation result is specifically implemented by including: an outer frame of the vehicle, and a position of a dividing line between the head of the vehicle and the body of the vehicle in the outer frame.

Correspondingly, the method according to this embodiment comprises following steps.

At step S210, a profile information annotation result for a vehicle in a two-dimensional image is obtained. The profile information annotation result includes: an outer frame of the vehicle, and a position of a dividing line between a head of the vehicle and a body of the vehicle in the outer frame.

In this embodiment, specifically, the outer frame of the vehicle may be an enclosing rectangular frame of the vehicle in the two-dimensional image. The position of the dividing line between the head of the vehicle and the body of the vehicle in the outer frame may be a position of the dividing line between the head of the vehicle and the body of the vehicle in the enclosing rectangular frame. For example, as illustrated in the plan view in FIG. 1b, the intersection point B is the leftmost point in the outer frame of the vehicle 1; the intersection point C is the rightmost point in the outer frame of the vehicle 1; and the intersection point D is the position of the dividing line between the head of the vehicle 1 and the body of the vehicle 1 in the outer frame.

As illustrated in FIG. 1b, by taking a practical example as the example, assuming that the geometric central point K (x, y) of the outer frame of the vehicle 1 is the reference two-dimensional image point, and the width and height of the outer frame of the vehicle 1 in the two-dimensional image 2 are respectively w and h, in which the width h of the outer frame is the distance between the intersection point B and the intersection point C, an abscissa of the leftmost point B in the outer frame of the vehicle 1 may be $$x_{left} = x - \frac{w}{2};$$

an abscissa of the rightmost point C may be $$x_{right} = x + \frac{w}{2};$$

and an abscissa of the position point D of the dividing line between the head of the vehicle 1 and the body of the vehicle 1 may be $x_{seg}$.

At step S220, depth of field of the target object is calculated according to an outer-frame height of the outer frame of the vehicle and an actual height of the vehicle in a standard three-dimensional size.

The outer-frame height of the outer frame of the vehicle may be a height of the enclosing rectangular frame of the vehicle in the two-dimensional image, i.e., a height of the vehicle in the two-dimensional image. A ratio of the outer-frame height of the outer frame of the vehicle to the actual height of the vehicle in the standard three-dimensional size, may be equal to a ratio of the photographing focal length of the two-dimensional image to the depth of field of the target object. Therefore, the depth of field of the vehicle, i.e., the depth of field of the target object, may be calculated according to the outer-frame height of the outer frame of the vehicle, the actual height of the vehicle in the standard three-dimensional size and a preset photographing focal length of the two-dimensional image.

Alternatively, calculating the depth of field of the target object according to the outer-frame height of the outer frame of the vehicle and the actual height of the vehicle in the standard three-dimensional size comprises: calculating the depth of field Z of the target object by the equation:

$$Z = \frac{H}{h}f,$$

where, H is the actual height of the vehicle; h is the outer-frame height; and f is the photographing focal length corresponding to the two-dimensional image.

As illustrated in FIG. 1b, the depth of field Z of the vehicle 1, i.e., the depth of field Z of the target object, may be calculated by the above calculation equation, according to the actual height H of the vehicle 1, the outer-frame height h of the outer frame of the vehicle 1, and the photographing focal length f of the two-dimensional image 2.

At step S230, the three-dimensional orientation of the target object is calculated according to the position of the dividing line between the head of the vehicle and the body of the vehicle in the outer frame, an actual length of the vehicle in the standard three-dimensional size and the depth of field of the target object.

In this embodiment, the three-dimensional orientation of the target object may be an angle of a longitudinal side of the vehicle with respect to the photographing plane, such as the angle γ illustrated in FIG. 1b. Specifically, a lateral distance between the dividing line between the head of the vehicle and the body of the vehicle, and the leftmost point in the outer frame of the vehicle, may be calculated according to the position of the dividing line between the head of the vehicle and the body of the vehicle in the outer frame. Then, a projection length of the longitudinal side of the body of the vehicle in a real scenario on the photographing plane of the two-dimensional image may be determined according to the lateral distance and a ratio of the depth of field of the vehicle to the photographing focal length. Finally, the three-dimensional orientation of the vehicle, i.e., the three-dimensional orientation of the target object, may be calculated by a preset geometric equation, according to the projection length and the actual length of the vehicle in the standard three-dimensional size.

Alternatively, calculating the three-dimensional orientation of the target object according to the position of the dividing line between the head of the vehicle and the body of the vehicle in the outer frame, the actual length of the vehicle in the standard three-dimensional size and the depth of field of the target object, comprises: calculating an abscissa $x_{left}$ of the leftmost point in the outer frame; calculating a lateral distance $w_{left}$ between the dividing line between the head of the vehicle and the body of the vehicle, and the leftmost point, according to the abscissa $x_{left}$ and the position of the dividing line between the head of the vehicle and the body of the vehicle in the outer frame; and calculating the three-dimensional orientation γ of the target object by the following equations:

$$N = \frac{Z}{f}w_{left}; \quad (1)$$

$$\alpha = \frac{\pi}{2} - \arctan\frac{x_{left}}{f}; \quad (2)$$

-continued $$\beta = \arcsin\left(\frac{N}{L}\sin\alpha\right); \quad (3)$$

$$\gamma = \pi - \alpha - \beta; \quad (4)$$

where, N is a projection length of a longitudinal side of the body of the vehicle in a real scenario on a photographing plane of the two-dimensional image; Z is the depth of field of the target object; α is an angle between a target light ray and the photographing plane; β is an angle between the target light ray and the longitudinal side of the body of the vehicle; L is the actual length of the vehicle in the standard three-dimensional size; and, the target light ray is a connecting line between the leftmost point of the vehicle in the real scenario and an intersection point with the two-dimensional image.

As illustrated in FIG. 1b, in a two-dimensional coordinate system which is established by taking the coordinate of the geometric central point K of the outer frame of the vehicle 1 in the two-dimensional image 2 as an origin (0,0), the abscissa of the leftmost point B in the outer frame of the vehicle 1 is $$x_{left} = -\frac{w}{2},$$

where, w is a width of the outer frame of the vehicle 1 in the two-dimensional image 2. When the abscissa of the position point D of the dividing line between the head of the vehicle and the body of the vehicle is $x_{seg}$, a distance between the intersection point B and the position point D, i.e., a lateral distance between the dividing line between the head of vehicle and the body of vehicle, and the leftmost point, is $w_{left}=x_{seg}-x_{left}$. A ratio of the projection length of the longitudinal side of the body of the vehicle 1 in the real scenario on the photographing plane of the two-dimensional image, i.e. a distance between the intersection point Q and the intersection point F, to a distance between the intersection point B and the position point D in the two-dimensional image 2, is equal to a ratio of the depth of field of the vehicle 1 to the photographing focal length of the two-dimensional image 2. Accordingly, the projection length N of the longitudinal side of the body of the vehicle 1 in the real scenario on the photographing plane of the two-dimensional image may be calculated by the above equation (1). Then, a value of an angle ∠ABK in a triangle formed by the photographing focus A, the intersection point B and the intersection point K may be calculated by the trigonometric function equation (2). Accordingly, the value of the angle α may be determined according to a parallel line theorem, i.e., by the equation (3). Then, the value of the angle β may be obtained according to the sine theorem in combination with the actual length L of the body of the vehicle 1 and the projection length N of the longitudinal side of the body of the vehicle 1 on the photographing plane of the two-dimensional image. Finally, the angle γ, i.e., the three-dimensional orientation of the target object, may be calculated according to the triangle interior angle summation theorem, i.e., by the equation (4).

At step S240, a three-dimensional coordinate of a reference two-dimensional image point in the target object is determined according to a two-dimensional coordinate of the reference two-dimensional image point in the two-dimensional image and the depth of field.

At step S250, three-dimensional data matching the target object is generated according to the three-dimensional coordinate of the reference two-dimensional image point and the three-dimensional orientation of the target object.

With the technical solution in embodiments of the present disclosure, by obtaining the outer frame of the vehicle in the two-dimensional image, and the position of the dividing line between the head of the vehicle and the body of the vehicle in the outer frame, the depth of field of the vehicle may be calculated in combination with the outer-frame height of the outer frame of the vehicle and the actual height of the vehicle in the standard three-dimensional size. Then, the three-dimensional orientation of the vehicle is calculated according to the position of the dividing line between the head of the vehicle and the body of the vehicle in the outer frame, the actual length of the vehicle in the standard three-dimensional size and the depth of field of the vehicle. Finally, the three-dimensional coordinate of the reference two-dimensional image point in the vehicle is determined according to the two-dimensional coordinate of the reference two-dimensional image point in the two-dimensional image and the depth of field, and the three-dimensional data matching the vehicle is generated according to the three-dimensional coordinate of the reference two-dimensional image point and the three-dimensional orientation of the vehicle. In this way, the three-dimensional data of the vehicle may be generated automatically by using the two-dimensional annotation of the vehicle, without performing the three-dimensional annotation on the vehicle manually, thereby reducing the cost of the three-dimensional annotation of the vehicle, and improving the efficiency of the three-dimensional annotation of the vehicle.

Embodiment 3

Figure 3:
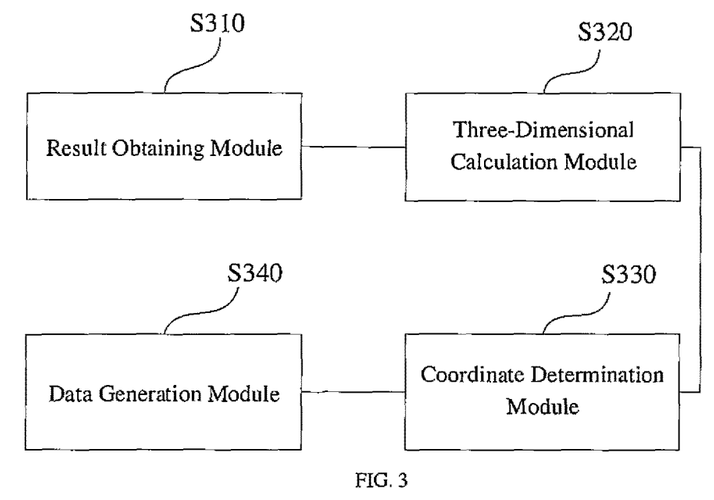
FIG. 3 is a step diagram illustrating an apparatus for generating three-dimensional data provided in Embodiment 3 of the present disclosure.

FIG. 3 is a step diagram illustrating an apparatus for generating three-dimensional data provided in Embodiment 3 of the present disclosure. As illustrated in FIG. 3, the apparatus comprises: a result obtaining module 310, a three-dimensional calculation module 320, a coordinate determination module 330, and a data generation module 340.

The result obtaining module 310 is configured to obtain a profile information annotation result for a target object in a two-dimensional image.

The three-dimensional calculation module 320 is configured to calculate depth of field of the target object and a three-dimensional orientation of the target object according to the profile information annotation result and a standard three-dimensional size of the target object.

The coordinate determination module 330 is configured to determine a three-dimensional coordinate of a reference two-dimensional image point in the target object according to a two-dimensional coordinate of the reference two-dimensional image point in the two-dimensional image and the depth of field.

The data generation module 340 is configured to generate the three-dimensional data matching the target object according to the three-dimensional coordinate of the reference two-dimensional image point and the three-dimensional orientation of the target object.

The embodiments of the present disclosure provide an apparatus for generating the three-dimensional data. By calculating the depth of field of the target object and the three-dimensional orientation of the target object according to the obtained profile information annotation result for a target object in a two-dimensional image and the standard three-dimensional size of the target object, determining the three-dimensional coordinate of the reference two-dimensional image point in the target object according to the two-dimensional coordinate of the reference two-dimensional image point in the two-dimensional image and the depth of field, and generating the three-dimensional data matching the target object according to the three-dimensional coordinate and the three-dimensional orientation of the target object, the three-dimensional information may be predicted by using the two-dimensional annotation, which solves the problem in the related art that the three-dimensional annotation is very expensive and time-consuming due to the manual annotation in the three-dimensional annotation, thereby reducing the cost of three-dimensional annotation and improving the efficiency of the three-dimensional annotation.

Further, the target object may include a vehicle. The profile information annotation result may include: an outer frame of the vehicle, and a position of a dividing line between a head of the vehicle and a body of the vehicle in the outer frame.

Further, the three-dimensional calculation module 320 may comprise: a depth of field calculation sub-module, and an orientation calculation sub-module.

The depth of field calculation sub-module is configured to calculate the depth of field of the target object according to an outer-frame height of the outer frame of the vehicle and an actual height of the vehicle in the standard three-dimensional size.

The orientation calculation sub-module is configured to calculate the three-dimensional orientation of the target object according to the position of the dividing line between the head of the vehicle and the body of the vehicle in the outer frame, an actual length of the vehicle in the standard three-dimensional size and the depth of field of the target object.

Further, the depth of field calculation sub-module may be configured to calculate the depth of field Z of the target object by the equation:

$$Z = \frac{H}{h}f,$$

where, H is the actual height of the vehicle; h is the outer-frame height; and f is a photographing focal length corresponding to the two-dimensional image.

Further, the orientation calculation sub-module is configured to calculate an abscissa $x_{left}$ of a leftmost point in the outer frame, to calculate a lateral distance $w_{left}$ between the dividing line between the head of the vehicle and the body of the vehicle and the leftmost point according to the abscissa $x_{left}$ and the position of the dividing line between the head of the vehicle and the body of the vehicle in the outer frame, and to calculate the three-dimensional orientation γ of the target object by the following equations:

$$N = \frac{Z}{f}w_{left};$$

$$\alpha = \frac{\pi}{2} - \arctan\frac{x_{left}}{f};$$

$$\beta = \arcsin\left(\frac{N}{L}\sin\alpha\right); \text{ and}$$

$$\gamma = \pi - \alpha - \beta;$$

where, N is a projection length of a longitudinal side of the body of the vehicle in a real scenario on a photographing plane of the two-dimensional image; Z is the depth of field of the target object; α is an angle between a target light ray and the photographing plane; β is an angle between the target light ray and the longitudinal side of the body of the vehicle; L is the actual length of the vehicle in the standard three-dimensional size; and, the target light ray is a connecting line between the leftmost point of the vehicle in the real scenario and an intersection point with the two-dimensional image.

Further, the apparatus for generating the three-dimensional data may further comprise an image cutting module, and a size obtaining module.

The image cutting module is configured to cut a partial image matching the target object from the two-dimensional image according to the profile information annotation result after obtaining the profile information annotation result for the target object in the two-dimensional image.

The size obtaining module is configured to input the partial image into a pre-trained standard three-dimensional recognition model, so as to obtain a standard three-dimensional size of the target object.

Further, the coordinate determination module 330 is configured to calculate the three-dimensional coordinate P of the reference two-dimensional image point by the following equation:

$$P = \begin{bmatrix} \frac{Z}{f} & 0 & 0 \\ 0 & 0 & 0 \\ 0 & 0 & 1 \end{bmatrix} \begin{bmatrix} x \\ y \\ z \end{bmatrix},$$

where, x is an abscissa of the reference two-dimensional image point; y is an ordinate of the reference two-dimensional image point; Z is the depth of field; and f is the photographing focal length corresponding to the two-dimensional image.

The above apparatus for generating the three-dimensional data may execute the method for generating the three-dimensional data provided in any of embodiments of the present disclosure, and have corresponding function modules for executing the method for generating the three-dimensional data and beneficial effects.

Embodiment 4

Figure 4:
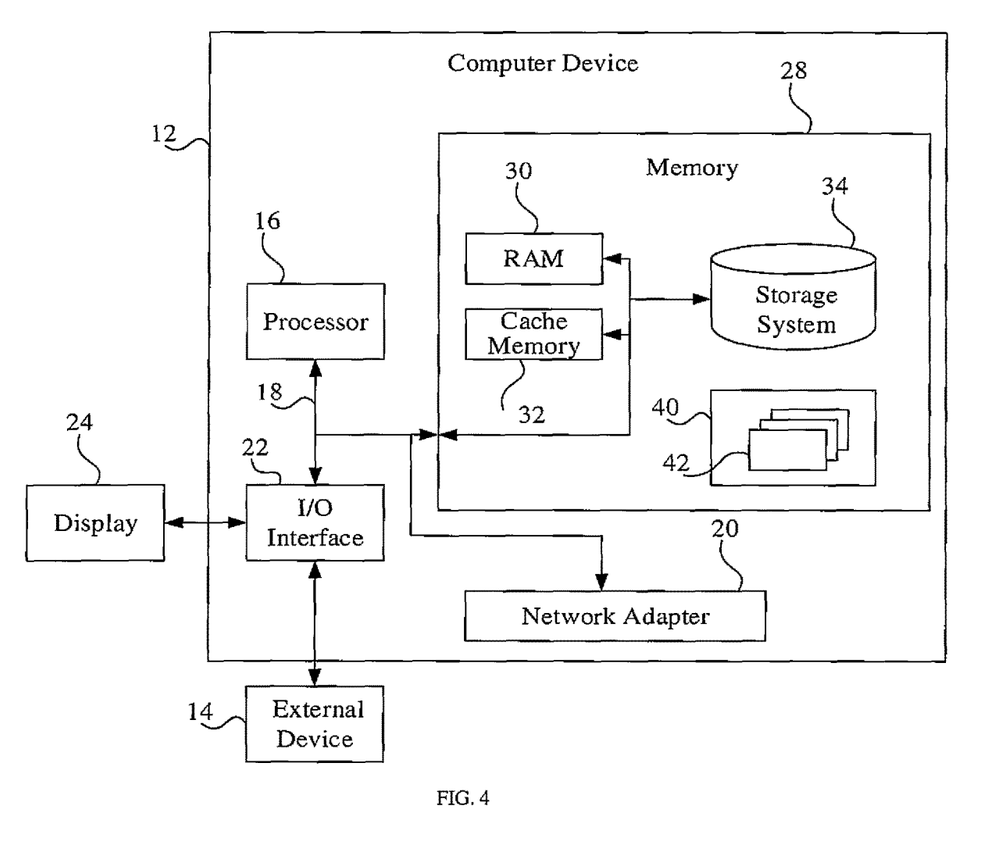
FIG. 4 is a schematic diagram illustrating a computer device provided in Embodiment 4 of the present disclosure.

FIG. 4 is a schematic diagram illustrating a computer device provided in Embodiment 4 of the present disclosure. FIG. 4 illustrates a diagram of an exemplary computer device 12 applicable to implement embodiments of the present disclosure. The computer device 12 illustrated in FIG. 4 is only an example, which may not bring any limitation to functions and scope of embodiments of the present disclosure.

As illustrated in FIG. 4, the computer device 12 is embodied in the form of a general-purpose computing device. Components of the computer device 12 may include but not limited to: one or more processors or processing units 16, a system memory 28, and a bus 18 connecting different system components (including the system memory 28 and the processing unit 16).

The bus 18 represents one or more of several bus structures, including a storage bus or a storage controller, a peripheral bus, an accelerated graphics port and a processor or a local bus with any bus structure in the plurality of bus structures. For example, these architectures include but not limited to an industry standard architecture (ISA) bus, a micro channel architecture (MAC) bus, an enhanced ISA bus, a video electronics standards association (VESA) local bus and a peripheral component interconnection (PCI) bus.

The computer device 12 typically includes a plurality of computer system readable mediums. These mediums may be any usable medium that may be accessed by the computer device 12, including volatile and non-volatile mediums, removable and non-removable mediums.

The system memory 28 may include computer system readable mediums in the form of volatile medium, such as a random access memory (RAM) 430 and/or a cache memory 432. The computer device 12 may further include other removable/non-removable, volatile/non-volatile computer system storage mediums. Only as an example, the storage system 34 may be configured to read from and write to non-removable, non-volatile magnetic mediums (not illustrated in FIG. 4, and usually called "a hard disk driver"). Although not illustrated in FIG. 4, a magnetic disk driver configured to read from and write to the removable non-volatile magnetic disc (such as "a diskette"), and an optical disc driver configured to read from and write to a removable non-volatile optical disc (such as a compact disc-read only memory (CD-ROM), a digital video disc-read only memory (DVD-ROM) or other optical mediums) may be provided. Under these circumstances, each driver may be connected with the bus 18 by one or more data medium interfaces. The system memory 28 may include at least one program product. The program product has a set of program modules (for example, at least one program module), and these program modules are configured to execute functions of respective embodiments of the present disclosure.

A program/utility tool 40, having a set (at least one) of program modules 42, may be stored in the system memory 28. Such program modules 42 include but not limited to an operating system, one or more application programs, other program modules, and program data. Each or any combination of these examples may include an implementation of a networking environment. The program module 42 usually executes functions and/or methods described in embodiments of the present disclosure.

The computer device 12 may communicate with one or more external devices 14 (such as a keyboard, a pointing device, and a display 24), may further communicate with one or more devices enabling a user to interact with the computer device 12, and/or may communicate with any device (such as a network card, and a modem) enabling the computer device 12 to communicate with one or more other computing devices. Such communication may occur via an input/output (I/O) interface 22. Moreover, the computer device 12 may further communicate with one or more networks (such as local area network (LAN), wide area network (WAN) and/or public network, such as Internet) via a network adapter 20. As illustrated in FIG. 4, the network adapter 420 communicates with other modules of the computer device 12 via the bus 18. It should be understood that, although not illustrated in FIG. 4, other hardware and/or software modules may be used in combination with the computer device 12, including but not limited to: microcode, device drivers, redundant processing units, external disk drive arrays, RAID (redundant array of independent disks) systems, tape drives, and data backup storage systems, etc.

The processor 16, by operating programs stored in the system memory 28, executes various function applications and data processing, for example implements a method for generating three-dimensional data provided in any of embodiments of the present disclosure. The processor, when executing the programs, implements to obtain a profile information annotation result for a target object in a two-dimensional image, to calculate depth of field of the target object and a three-dimensional orientation of the target object according to the profile information annotation result and a standard three-dimensional size of the target object, to determine a three-dimensional coordinate of a reference two-dimensional image point in the target object according to a two-dimensional coordinate of the reference two-dimensional image point in the two-dimensional image and the depth of field, and to generate three-dimensional data matching the target object according to the three-dimensional coordinate of the reference two-dimensional image point and the three-dimensional orientation of the target object.

Embodiment 5

Embodiment 5 of the present disclosure provides a computer readable storage medium having a computer program stored thereon. When executed by a computer processor, the computer program is configured to implement a method for generating three-dimensional data provided in any of embodiments of the present disclosure. The program, when executed by the processor, implements to obtain a profile information annotation result for a target object in a two-dimensional image, to calculate depth of field of the target object and a three-dimensional orientation of the target object according to the profile information annotation result and a standard three-dimensional size of the target object, to determine a three-dimensional coordinate of a reference two-dimensional image point in the target object according to a two-dimensional coordinate of the reference two-dimensional image point in the two-dimensional image and the depth of field, and to generate three-dimensional data matching the target object according to the three-dimensional coordinate of the reference two-dimensional image point and the three-dimensional orientation of the target object.

The computer storage medium may employ any combination of one or more computer readable mediums. The computer readable medium may be a computer readable signal medium or a computer readable storage medium. The computer readable storage medium may be, for example, but not limited to an electronic, magnetic, optical, electromagnetic, infrared, or semiconductor system, apparatus or device, or any suitable combination of the foregoing. More specific examples (a non-exhaustive list) of the computer readable storage medium may include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical memory device, a magnetic memory device, or any appropriate combination of the foregoing. In this document, the computer readable storage medium can be any tangible medium that contains or stores a program. The program can be used by or in conjunction with an instruction execution system, apparatus or device.

The computer readable signal medium may include a data signal transmitted in the baseband or as part of a carrier, in which computer readable program codes are carried. The transmitted data signal may employ a plurality of forms, including but not limited to an electromagnetic signal, a light signal or any suitable combination thereof. The computer readable signal medium may further be any computer readable medium other than the computer readable storage medium. The computer readable medium may send, propagate or transmit programs configured to be used by or in combination with an instruction execution system, apparatus or device.

The program codes included in the computer readable medium may be transmitted by any appropriate medium, including but not limited to wireless, electric wire, optical cable, RF (Radio Frequency), or any suitable combination of the foregoing.

The computer program codes for executing operations of the present disclosure may be programmed using one or more programming languages or the combination thereof. The programming languages include object-oriented programming languages, such as Java, Smalltalk, C++, and further include conventional procedural programming languages, such as the C programming language or similar programming languages. The program codes may be executed entirely on a user computer, partly on the user computer, as a stand-alone software package, partly on the user computer and partly on a remote computer, or entirely on the remote computer or server. In the scenario involving the remote computer, the remote computer may be connected to the user computer through any type of network, including a local area network (LAN) or a wide area network (WAN), or may be connected to an external computer (for example, through the Internet using an Internet service provider).

The above is only an optimal embodiment of the present disclosure and technical principle applied thereto. It should be understood by the skilled in the art that, the present disclosure is not limited to the specific embodiment described herein. The skilled in the art may make various obvious changes, modifications and alternatives without departing from the scope of the present disclosure. Therefore, although a detailed illumination is made to the present disclosure by the above embodiments, the present disclosure is not merely limited to the above embodiments. More other equivalent embodiments may also be included without departing from the technical idea of the present disclosure. The scope of the present disclosure is determined by the appended claims.

What is claimed is:

1. A method for generating three-dimensional data, comprising:
   obtaining a profile information annotation result for a target object in a two-dimensional image;
   calculating depth of field of the target object and a three-dimensional orientation of the target object according to the profile information annotation result and a standard three-dimensional size of the target object;
   determining a three-dimensional coordinate of a reference two-dimensional image point in the target object according to a two-dimensional coordinate of the reference two-dimensional image point in the two-dimensional image and the depth of field; and
   generating three-dimensional data matching the target object according to the three-dimensional coordinate of the reference two-dimensional image point and the three-dimensional orientation of the target object.

2. The method of claim 1, wherein,
   the target object includes a vehicle, and
   the profile information annotation result includes: an outer frame of the vehicle, and a position of a dividing line between a head of the vehicle and a body of the vehicle in the outer frame.

3. The method of claim 2, wherein, calculating the depth of field of the target object and the three-dimensional orientation of the target object according to the profile information annotation result and the standard three-dimensional size of the target object comprises:
   calculating the depth of field of the target object according to an outer-frame height of the outer frame of the vehicle and an actual height of the vehicle in the standard three-dimensional size; and
   calculating the three-dimensional orientation of the target object according to the position of the dividing line between the head of the vehicle and the body of the vehicle in the outer frame, an actual length of the vehicle in the standard three-dimensional size and the depth of field of the target object.

4. The method of claim 3, wherein, calculating the depth of field of the target object according to the outer-frame height of the outer frame of the vehicle and the actual height of the vehicle in the standard three-dimensional size comprises:
   calculating the depth of field Z of the target object by the equation:

$$Z = \frac{H}{h}f,$$

where, H is the actual height of the vehicle; h is the outer-frame height; and f is a photographing focal length corresponding to the two-dimensional image.

5. The method of claim 4, wherein, calculating the three-dimensional orientation of the target object according to the position of the dividing line between the head of the vehicle and the body of the vehicle in the outer frame, the actual length of the vehicle in the standard three-dimensional size and the depth of field of the target object comprises:
   calculating an abscissa $x_{left}$ of a leftmost point in the outer frame;
   calculating a lateral distance $w_{left}$ between the dividing line between the head of the vehicle and the body of the vehicle and the leftmost point according to the abscissa $x_{left}$ and the position of the dividing line between the head of the vehicle and the body of the vehicle in the outer frame; and
   calculating the three-dimensional orientation $\gamma$ of the target object by the following equations:

$$N = \frac{Z}{f}w_{left};$$

$$\alpha = \frac{\pi}{2} - \arctan\frac{x_{left}}{f};$$

$$\beta = \arcsin\left(\frac{N}{L}\sin\alpha\right); \text{ and}$$

$$\gamma = \pi - \alpha - \beta;$$

where, N is a projection length of a longitudinal side of the body of the vehicle in a real scenario on a photographing plane of the two-dimensional image; Z is the depth of field of the target object; α is an angle between a target light ray and the photographing plane; β is an angle between the target light ray and the longitudinal side of the body of the vehicle; L is the actual length of the vehicle in the standard three-dimensional size; and, the target light ray is a connecting line between the leftmost point of the vehicle in the real scenario and an intersection point with the two-dimensional image.

6. The method of claim 1, after obtaining the profile information annotation result for the target object in the two-dimensional image, further comprising:
cutting a partial image matching the target object from the two-dimensional image according to the profile information annotation result; and
inputting the partial image into a pre-trained standard three-dimensional recognition model, to obtain the standard three-dimensional size of the target object.

7. The method of claim 1, wherein, determining the three-dimensional coordinate of the reference two-dimensional image point in the target object according to the two-dimensional coordinate of the reference two-dimensional image point in the two-dimensional image and the depth of field comprises:
calculating the three-dimensional coordinate P of the reference two-dimensional image point by the following equation:

$$P = \begin{bmatrix} \frac{Z}{f} & 0 & 0 \\ 0 & 0 & 0 \\ 0 & 0 & 1 \end{bmatrix} \begin{bmatrix} x \\ y \\ z \end{bmatrix},$$

where, x is an abscissa of the reference two-dimensional image point; y is an ordinate of the reference two-dimensional image point; Z is the depth of field; and f is the photographing focal length corresponding to the two-dimensional image.

8. An apparatus for generating three-dimensional data, comprising:
a memory;
a processor; and
a computer program stored in the memory and operable in the processor,
wherein, when the program is executed by the processor, the processor is configured to implement a method for generating three-dimensional data, comprising:
obtaining a profile information annotation result for a target object in a two-dimensional image;
calculating depth of field of the target object and a three-dimensional orientation of the target object according to the profile information annotation result and a standard three-dimensional size of the target object;
determining a three-dimensional coordinate of a reference two-dimensional image point in the target object according to a two-dimensional coordinate of the reference two-dimensional image point in the two-dimensional image and the depth of field; and
generating three-dimensional data matching the target object according to the three-dimensional coordinate of the reference two-dimensional image point and the three-dimensional orientation of the target object.

9. The apparatus of claim 8, wherein,
the target object includes a vehicle, and
the profile information annotation result includes: an outer frame of the vehicle, and a position of a dividing line between a head of the vehicle and a body of the vehicle in the outer frame.

10. The apparatus of claim 9, wherein, when the processor is configured to calculate the depth of field of the target object and the three-dimensional orientation of the target object according to the profile information annotation result and the standard three-dimensional size of the target object, the processor is configured:
to calculate the depth of field of the target object according to an outer-frame height of the outer frame of the vehicle and an actual height of the vehicle in the standard three-dimensional size; and
to calculate the three-dimensional orientation of the target object according to the position of the dividing line between the head of the vehicle and the body of the vehicle in the outer frame, an actual length of the vehicle in the standard three-dimensional size and the depth of field of the target object.

11. The apparatus of claim 10, wherein, when the processor is configured to calculate the depth of field of the target object according to the outer-frame height of the outer frame of the vehicle and the actual height of the vehicle in the standard three-dimensional size, the processor is configured:
to calculate the depth of field Z of the target object by the equation:

$$Z = \frac{H}{h} f,$$

where, H is the actual height of the vehicle; h is the outer-frame height; and f is a photographing focal length corresponding to the two-dimensional image.

12. The apparatus of claim 11, wherein, when the processor is configured to calculate the three-dimensional orientation of the target object according to the position of the dividing line between the head of the vehicle and the body of the vehicle in the outer frame, the actual length of the vehicle in the standard three-dimensional size and the depth of field of the target object, the processor is configured:
to calculate an abscissa $x_{left}$ of a leftmost point in the outer frame;
to calculate a lateral distance $w_{left}$ between the dividing line between the head of the vehicle and the body of the vehicle and the leftmost point according to the abscissa $x_{left}$ and the position of the dividing line between the head of the vehicle and the body of the vehicle in the outer frame; and
to calculate the three-dimensional orientation γ of the target object by the following equations:

$$N = \frac{Z}{f} w_{left};$$

$$\alpha = \frac{\pi}{2} - \arctan \frac{x_{left}}{f};$$

-continued $$\beta = \arcsin\left(\frac{N}{L}\sin\alpha\right); \text{ and}$$

$$\gamma = \pi - \alpha - \beta;$$

where, N is a projection length of a longitudinal side of the body of the vehicle in a real scenario on a photographing plane of the two-dimensional image; Z is the depth of field of the target object; α is an angle between a target light ray and the photographing plane; β is an angle between the target light ray and the longitudinal side of the body of the vehicle; L is the actual length of the vehicle in the standard three-dimensional size; and, the target light ray is a connecting line between the leftmost point of the vehicle in the real scenario and an intersection point with the two-dimensional image.

13. The apparatus of claim 8, after the processor obtains the profile information annotation result for the target object in the two-dimensional image, the processor is further configured:
to cut a partial image matching the target object from the two-dimensional image according to the profile information annotation result; and
to input the partial image into a pre-trained standard three-dimensional recognition model, to obtain the standard three-dimensional size of the target object.

14. The apparatus of claim 8, wherein, when the processor is configured to determine the three-dimensional coordinate of the reference two-dimensional image point in the target object according to the two-dimensional coordinate of the reference two-dimensional image point in the two-dimensional image and the depth of field, the processor is configured:
to calculate the three-dimensional coordinate P of the reference two-dimensional image point by the following equation:

$$P = \begin{bmatrix} \frac{Z}{f} & 0 & 0 \\ 0 & 0 & 0 \\ 0 & 0 & 1 \end{bmatrix} \begin{bmatrix} x \\ y \\ z \end{bmatrix},$$

where, x is an abscissa of the reference two-dimensional image point; y is an ordinate of the reference two-dimensional image point; Z is the depth of field; and f is the photographing focal length corresponding to the two-dimensional image.

15. A non-transitory computer readable storage medium having a computer program stored thereon, wherein, the computer program is executed by a processor to implement a method for generating three-dimensional data, comprising:
obtaining a profile information annotation result for a target object in a two-dimensional image;
calculating depth of field of the target object and a three-dimensional orientation of the target object according to the profile information annotation result and a standard three-dimensional size of the target object;
determining a three-dimensional coordinate of a reference two-dimensional image point in the target object according to a two-dimensional coordinate of the reference two-dimensional image point in the two-dimensional image and the depth of field; and
generating three-dimensional data matching the target object according to the three-dimensional coordinate of the reference two-dimensional image point and the three-dimensional orientation of the target object.

16. The non-transitory computer readable storage medium of claim 15, wherein,
the target object includes a vehicle, and
the profile information annotation result includes: an outer frame of the vehicle, and a position of a dividing line between a head of the vehicle and a body of the vehicle in the outer frame.

17. The non-transitory computer readable storage medium of claim 16, wherein, calculating the depth of field of the target object and the three-dimensional orientation of the target object according to the profile information annotation result and the standard three-dimensional size of the target object comprises:
calculating the depth of field of the target object according to an outer-frame height of the outer frame of the vehicle and an actual height of the vehicle in the standard three-dimensional size; and
calculating the three-dimensional orientation of the target object according to the position of the dividing line between the head of the vehicle and the body of the vehicle in the outer frame, an actual length of the vehicle in the standard three-dimensional size and the depth of field of the target object.

18. The non-transitory computer readable storage medium of claim 17, wherein, calculating the depth of field of the target object according to the outer-frame height of the outer frame of the vehicle and the actual height of the vehicle in the standard three-dimensional size comprises:
calculating the depth of field Z of the target object by the equation:

$$Z = \frac{H}{h}f,$$

where, H is the actual height of the vehicle; h is the outer-frame height; and f is a photographing focal length corresponding to the two-dimensional image.

19. The non-transitory computer readable storage medium of claim 18, wherein, calculating the three-dimensional orientation of the target object according to the position of the dividing line between the head of the vehicle and the body of the vehicle in the outer frame, the actual length of the vehicle in the standard three-dimensional size and the depth of field of the target object comprises:
calculating an abscissa $x_{left}$ of a leftmost point in the outer frame;
calculating a lateral distance $w_{left}$ between the dividing line between the head of the vehicle and the body of the vehicle and the leftmost point according to the abscissa $x_{left}$ and the position of the dividing line between the head of the vehicle and the body of the vehicle in the outer frame; and
calculating the three-dimensional orientation γ of the target object by the following equations:

$$N = \frac{Z}{f}w_{left};$$

-continued $$\alpha = \frac{\pi}{2} - \arctan\frac{x_{left}}{f};$$

$$\beta = \arcsin\left(\frac{N}{L}\sin\alpha\right); \text{ and}$$

$$\gamma = \pi - \alpha - \beta;$$

where, N is a projection length of a longitudinal side of the body of the vehicle in a real scenario on a photographing plane of the two-dimensional image; Z is the depth of field of the target object; $\alpha$ is an angle between a target light ray and the photographing plane; $\beta$ is an angle between the target light ray and the longitudinal side of the body of the vehicle; L is the actual length of the vehicle in the standard three-dimensional size; and, the target light ray is a connecting line between the leftmost point of the vehicle in the real scenario and an intersection point with the two-dimensional image.

20. The non-transitory computer readable storage medium of claim 15, after obtaining the profile information annotation result for the target object in the two-dimensional image, further comprising:
cutting a partial image matching the target object from the two-dimensional image according to the profile information annotation result; and
inputting the partial image into a pre-trained standard three-dimensional recognition model, to obtain the standard three-dimensional size of the target object.

* * * * *